United States Patent [19]

Kuboyama

[11] Patent Number: 5,558,006
[45] Date of Patent: Sep. 24, 1996

[54] HEALTH BEVERAGE PLANT EXTRACTION APPARATUS

[76] Inventor: Nobuyoshi Kuboyama, 96 Litchfield Dr., Carlisle, Mass. 01741

[21] Appl. No.: 286,001

[22] Filed: Aug. 4, 1994

[51] Int. Cl.$^6$ ....................................... A47J 31/00
[52] U.S. Cl. .............................. 99/275; 99/295; 426/432; 426/435
[58] Field of Search .......................... 99/275, 276, 277, 99/277.1, 277.2, 279, 300, 483, 295, 323.4, 323.3; 426/431, 433, 435, 436, 432

[56] References Cited

U.S. PATENT DOCUMENTS

| | | | |
|---|---|---|---|
| 3,535,116 | 10/1970 | Harsanyi | 426/436 |
| 3,871,272 | 3/1975 | Melandri | 99/276 |
| 4,220,673 | 9/1980 | Strobel | 426/435 |
| 4,919,041 | 4/1990 | Miller | 99/279 |

*Primary Examiner*—Robert W. Jenkins
*Attorney, Agent, or Firm*—Barry R. Lipsitz

[57] ABSTRACT

A health beverage is provided from plant, animal or mineral material that includes an ingredient beneficial to human health. The effective ingredient is extracted from the material by atomizing water in an ultrasonic tank. A blower is used to suck the atomized droplets through a canister containing the plant, animal or mineral material. The atomized droplets are then condensed in a cooling tank to a liquid form containing the healthful ingredient extracted from the plant, animal or mineral material.

**

5,558,006

HEALTH BEVERAGE PLANT EXTRACTION APPARATUS

INDUSTRIAL APPLICABILITY

The present invention relates to a health beverage that an effective ingredient extracted from a plant material, animal material or mineral material which includes an ingredient effective for human health from ancient times is major ingredient.

BACKGROUND ART

A certain material of some kind among a plant material, animal material or mineral material includes some ingredient particularly effective for human health. However, many of these materials can not be directly provided for food, or even if it is possible to be provided directly to eat, it is inconvenient in most cases. For this reason, heretofore some attempt has been done which extracts a containing ingredient by various extracting method whereby utilizing the extracted ingredient.

For instance, Korean ginseng is made either by extracting the ingredient by boiling for long time at high temperature into water, or the extraction of effective ingredient is carried out by a distilling method or a solution extracting method.

However, there has been a problem that an ingredient included in a material can not be effectively picked up by conventional extracting method. That is, in various plant materials, animal materials or mineral materials which are useful for human health maintaining, there is contained with an ingredient which would be destroyed at high temperature, or very small amount of active ingredient which may not be found by a current analyzing technique.

Accordingly, for instance, in case of extracting an ingredient by boiling the Korean ginseng, or in case of extracting an ingredient by a boiling method, the extraction of material which can not bear at high temperature is impossible.

And, since an exact analysis of the ingredient is required in the solution extracting method, for instance, the extraction of very small amount of unknown material contained within the Korean ginseng and other material is impossible.

For this reason, despite some kind of effective material is known to be useful for the human health maintaining, it is present situation that its effective utilization can not be done. The present invention is done under the background as described above.

SUMMARY OF THE INVENTION

Therefore, it is an object of the present invention to provide a technique for manufacturing a health beverage by extracting an effective ingredient containing a very small amount of ingredient which could not been extracted by conventional technique from various useful material, and the health beverage containing the extracted effective ingredient.

That is, the health beverage manufacturing apparatus comprises:

A pulverizing minute particle generating tank or atomizer, including a heater for heating a reservoir of water to a predetermined temperature, an extracting device connected to the atomizer for generating tank by holding a raw material layer for adhering an effective ingredient of raw material to the atomized water when it through the raw material layer, a condensing device connected to the extracting device for liquefying the atomized water passed through the raw material layer, a reservoir tank for receiving water liquefied at the condensing device, a blower provided to a path between the reservoir tank and the atomizer and for decompressing the raw material layer within the extracting device, and a cooling means for cooling the condensing device and the reservoir tank.

And, a manufacturing method of the health beverage comprises following processes:

(a) a process for generating including a heater for heating a reserved water to a predetermined temperature and an atomizer, (b) a process for sucking and extracting out the effective ingredient within the raw material to a surface by decompressing the raw material layer made of crashed pieces such as plant material, animal material or mineral material filled with the pulverized minute particle into the extracting device, (c) a process for holding the effective ingredient sucked and extracted out to the surface of the raw material to the atomized water passing through the raw material layer by feeding the atomized water together with an air flow circulating between each devices to the raw material layer residing in a decompressed condition, (d) a process for liquefying by feeding the pulverized minute containing the effective ingredient to a cooled condensing device, (e) a process for obtaining a finished product by dropping a water liquefied at the condensing device and containing an effective ingredient of various raw materials to the reservoir tank, and (f) a process for returning the atomized water which was not liquefied at the condensing device to the atomizer. And, the health beverage is manufactured through:

(a) a process for generating atomized water water in a pulverizing minute particle generating tank including a heater for heating a reserved water to a predetermined temperature and, an atomizer, (b) a process for sucking and extracting out the effective ingredient within the raw material to a surface by decompressing the raw material layer made of crashed pieces such as plant material, animal material or mineral material filled with the atomized water into the extracting device, (c) a process for holding the effective ingredient sucked and extracted out to the surface of the raw material to the atomized water by passing through the raw material layer by feeding the atomized water together with an air flow circulating between each devices to the raw material layer residing in a decompressed condition, (d) a process for liquefying by feeding the atomized water containing the effective ingredient to a cooled condensing device, (e) a process for returning the atomized water which was not liquefied at the condensing device to the atomizer, and thereby containing very small amount of active ingredient that an analysis and picking up were not impossible in the conventional technique, and therefore it is a very much useful beverage for human health maintaining.

DETAILED DESCRIPTION OF THE PREFERRED EMBODIMENTS

Figure 1:
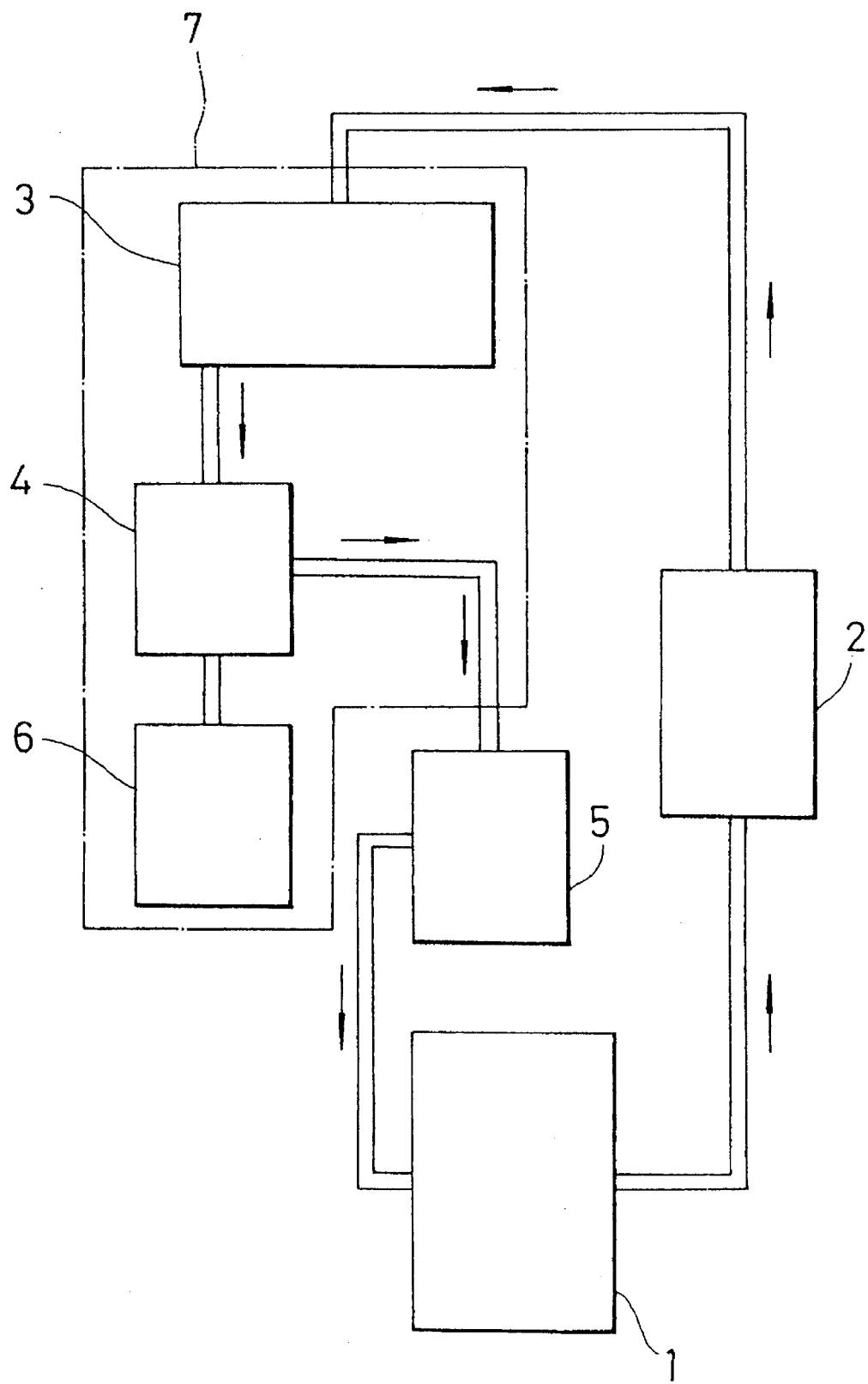
FIG. 1 is a block diagram showing a construction of a health beverage manufacturing apparatus and manufacturing method thereof.

Hereinafter, a preferred embodiment of the present invention will be described more in detail with reference to the accompanying drawings. FIG. 1 is a block diagram showing a construction of a first embodiment of the health beverage manufacturing apparatus, and in the drawing, a numeral symbol 1 is an atomizer, a reference numeral symbol 2 is an extracting device for extracting an effective ingredient from raw material by atomized water sent from the atomizer 1, a reference numeral symbol 3 is a condensing device for liquefying the atomized water holding the effective ingredient within the raw material transferred from the extracting device 2, a reference numeral symbol 4 is a reserving tank for receiving water liquefied at the condensing device 3 and containing the effective ingredient of the raw material from the condensing device 3, and a reference numeral symbol 5 is a blower provided between the reserving tank 4 and the atomizer 1. And, a reference numeral symbol 6 is a second reservoir tank connected to the reservoir tank 4, and a reference numeral symbol 7 is a cooling means for cooling the condensing device 3, the reservoir tank 4, and the second reservoir tank 6. As shown in the drawing, each device such as the atomizer 1 and the extracting device 2 is respectively connected by a connecting pipe, so that a circulating path is formed around the atomizer 1, and it is made such that the atomizer water circulates together with an air flow via an operation of the blower in this circulating path.

Figure 2:
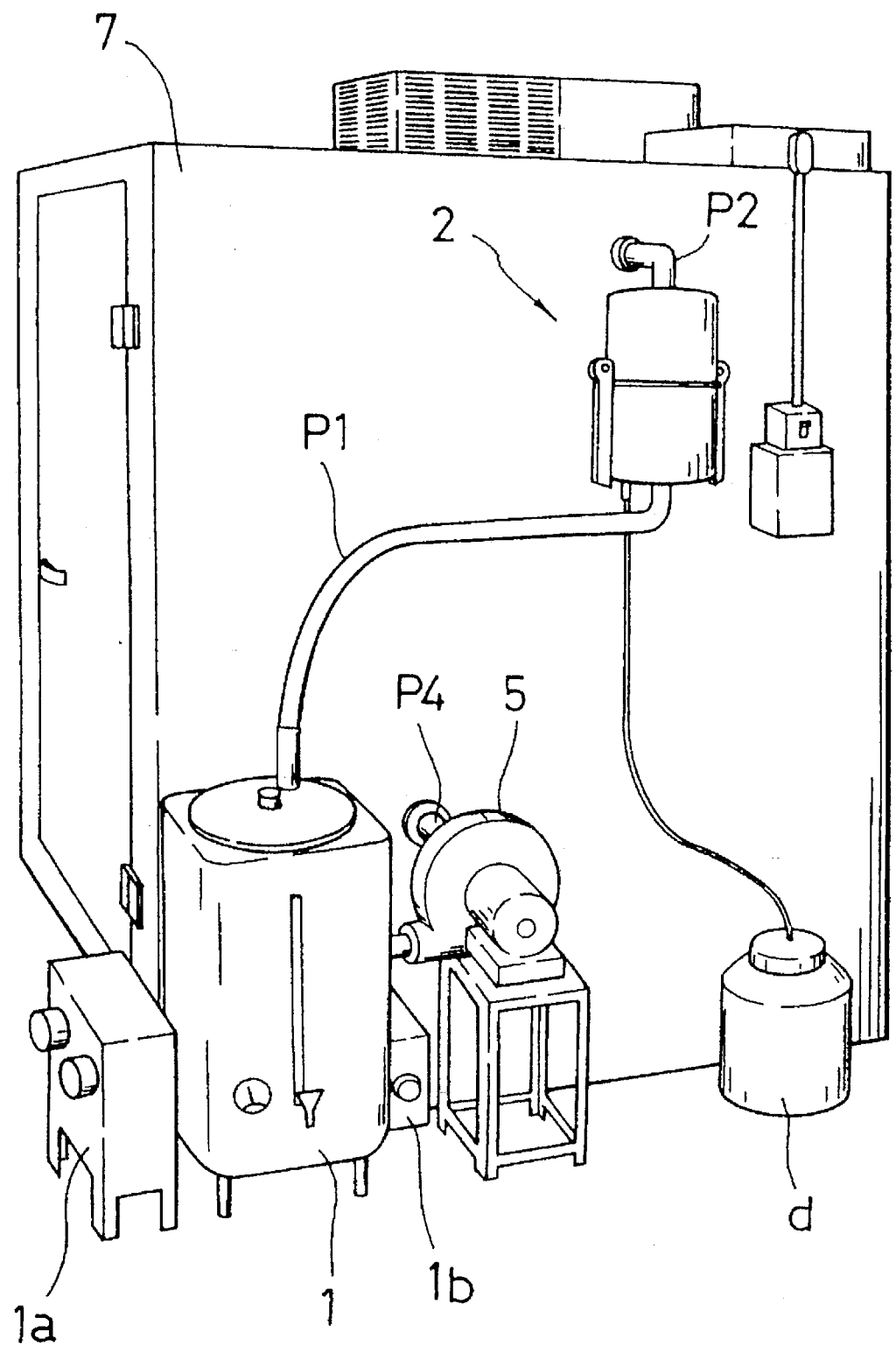
FIG. 2 is a schematic perspective view of entire system of the health beverage manufacturing apparatus, FIG. 3 (A) and (B) are perspective views of external appearance of interior of cooling chamber of the health beverage manufacturing apparatus.

FIG. 2 is a schematic perspective view of external appearance of the health beverage manufacturing apparatus having the above described construction. In the drawing, a reference numeral symbol 1 is an atomizer structured by a water tank made of stainless steel of 60 cm in depth, and it is so made that a water approximately 30–40 liters is always reserved during operation in this water tank. A reference numeral symbol 1a is a ultrasonic wave generating device, and eight vibrators possessed by it are provided at bottom of the water tank 1, and each vibrator has an ability to atomize of about 0.5 liters of water per one hour. A reference numeral symbol 1b is a heater for maintaining the water temperature to a predetermined temperature.

And, a reference numeral symbol 2 is a hereinafter described extracting device, and it is provided at a side wall of the cooling chamber 7 as a cooling means, and connected with the atomizer 1 by a flexible plastic pipe P of 28 mm in diameter and about 1.3 m in length. Further, a reference symbol d is a discharging water tank for receiving a water discharged from the extracting device 2. And, a reference symbol P2 is a pipe for connecting the extracting device 2 and a hereinafter described condensing device 3, and used with metal pipe of 40 mm in diameter.

Figure 3A:
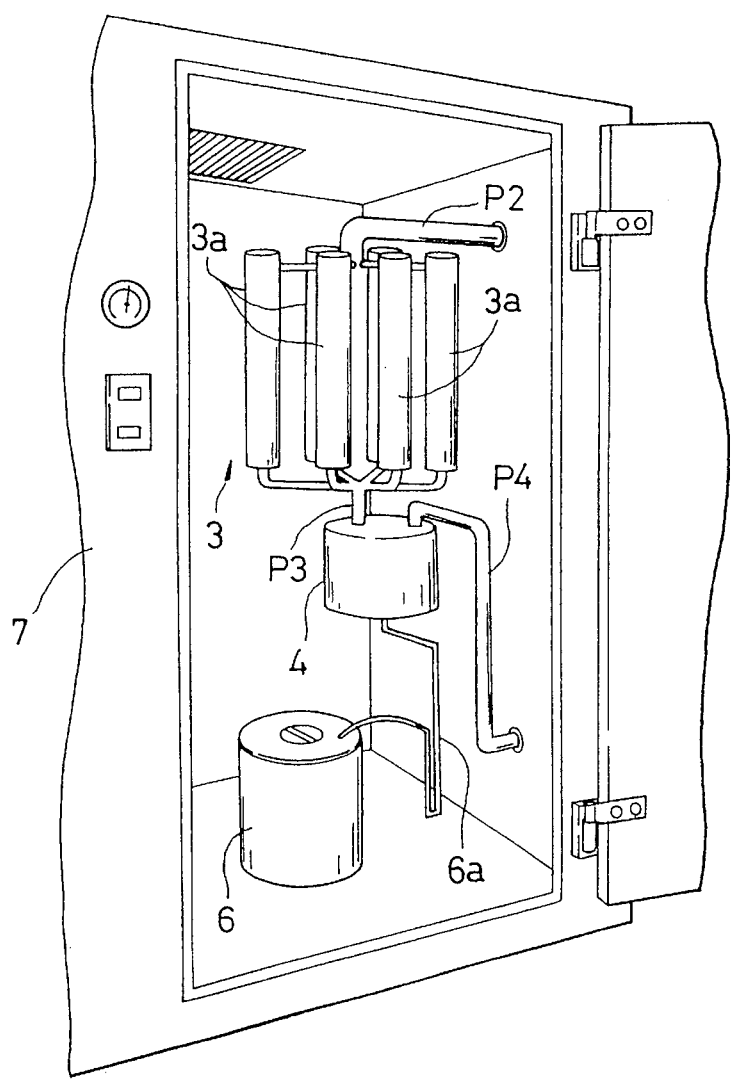
Figure 3B:
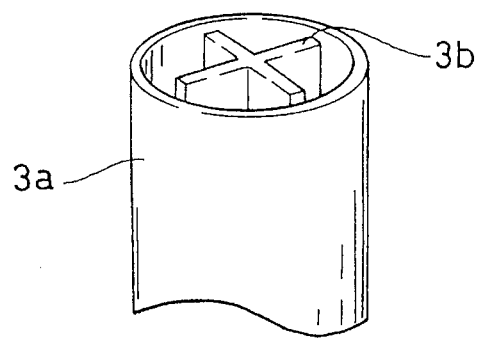

FIG. 3 is a fragmentary perspective view showing an interior of the cooling chamber 7, and in the drawing, a reference numeral symbol 3 is a condensing device made of a plurality (six in this embodiment) of condensing cylinders 3a, and connected with the extracting device 2 of outside of the cooling chamber 7 by a pipe P2 as described above. In this embodiment, each condensing cylinder 3a is structured by metal pipe of 85 mm in diameter and about 550 mm in length, and a cooling plate 3b is provided at interior of each condensing cylinder 3a as shown in FIG. 3(B). Top end of each condensing cylinder 3a is connected to the connecting pipe P2 by a branch pipe, and bottom end is connected to a connecting pipe P3 by a branch pipe as same as former.

A reference numeral symbol 4 is a reservoir tank connected with aforementioned condensing device 3 by a connecting pipe P3 of 40 mm in diameter, and it is provided for receiving water liquefied from the atomized water at the condensing device 3. A top portion of this reservoir tank 4 and the aforementioned blower 5 provided at outside of the cooling chamber are connected by a connecting pipe P4 of 40 mm in diameter. Further, a reference numeral symbol 6 is a second reservoir tank, and it is connected by a drain pipe 6a with the reservoir tank 4. The cooling device of the cooling chamber 7 is provided at top ceiling portion, and a window type air conditioner may be fixed at a side wall portion for increasing a cooling capacity.

Figure 4:
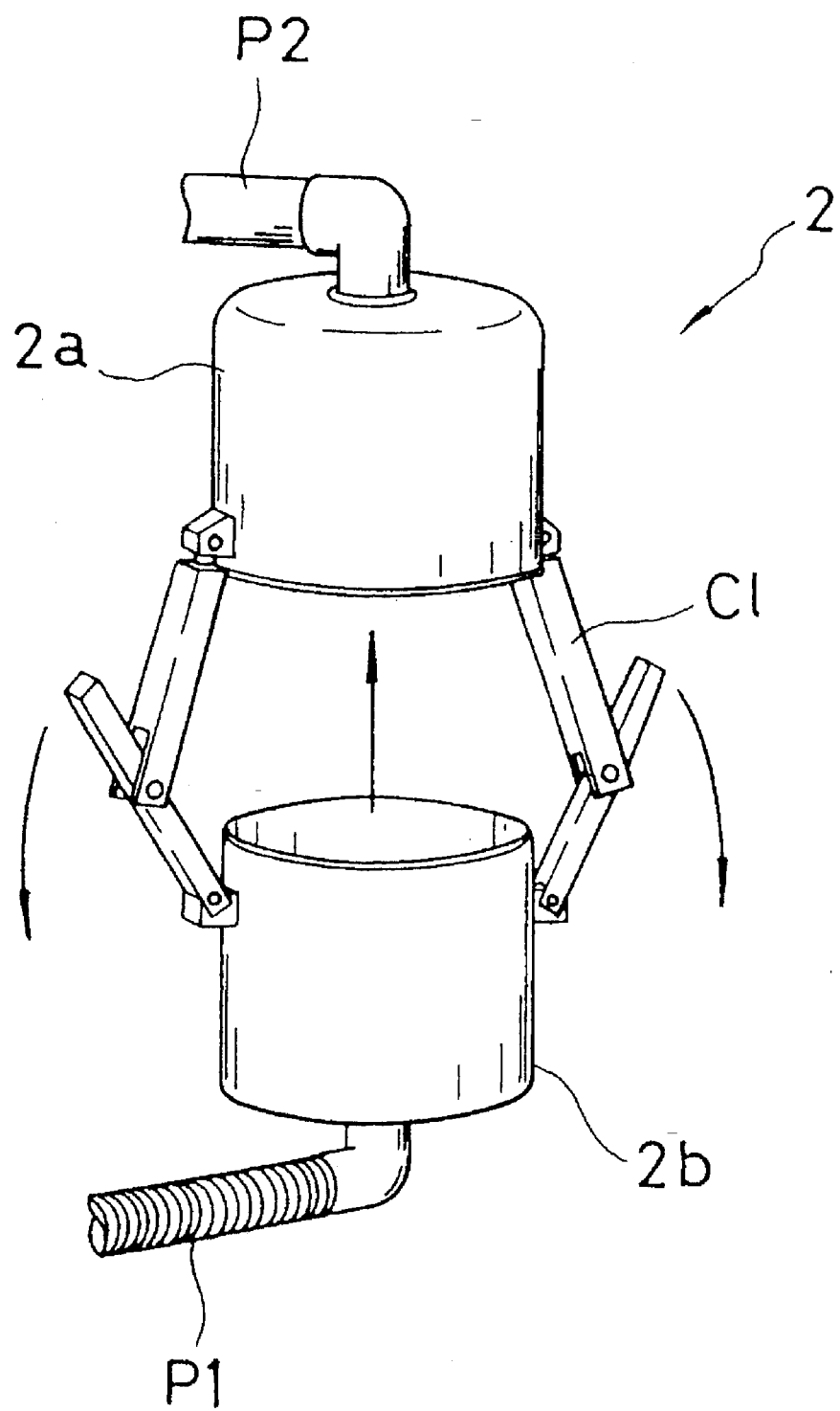
FIG. 4 is a fragmentary perspective view of external cylinder in an extracting device, and FIG. 5 (A), (B) and (C) are perspective views of external appearance showing the construction of internal cylinder in the extracting device.

FIG. 4 is a perspective view of external appearance of external cylinder which is a constituting element of the extracting device 2, and it includes a first external cylinder 2a and a second external cylinder 2b, both are made so as to be supported by freely jointing, releasing and opening, either forms a cylindrical shape of 200 mm in diameter and about 150 mm in depth, and it is a member made of stainless steel. Further, a temperature sensor for detecting a temperature upon the extracting operation is fixed at the second external cylinder 2b of bottom side.

Figure 5A:
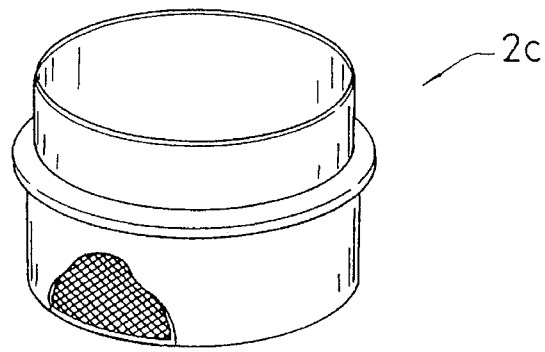

FIG. 5 is a schematic diagram of internal cylinder which is a constituting element of the extracting device 2, and FIG. 5 (A) is a perspective view of the internal cylinder 2c. The internal cylinder 2c forms a shape of size capable of fitting to the aforementioned external cylinder, and a net portion for holding the raw material crushed to small pieces is provided at bottom portion.

Figure 5B:
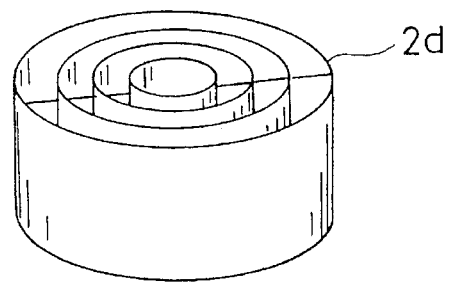
Figure 5C:
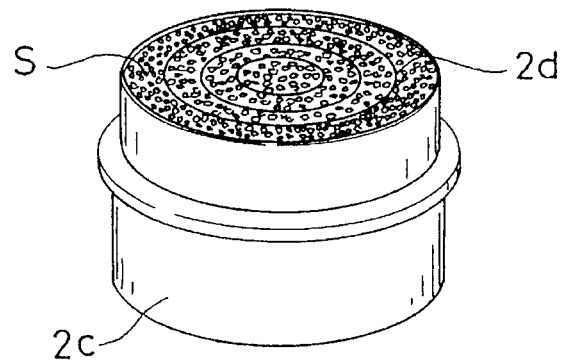

FIG. 5(B) shows a guide plate for inserting to the internal cylinder 2c, and as shown in FIG. 5(C), it is made to partition the crushed pieces S of raw material such as soy beans, malts or Korean ginsengs in an interior of the internal cylinder 2c. Existence of this guide plate 2d brings an effect to make a pass of the pulverized minute particle to be easy and smooth as will be described hereinafter. Further, this guide plate 2d may be formed to a spiral shape.

As described above, the extracting device 2 is structured by a pair of external cylinders and the internal cylinders for inserting to these.

Operation of the health beverage manufacturing apparatus will be described based on the above described construction, and also a preferred embodiment of the health beverage manufacturing method will be described.

First, soy beans crushed to a magnitude of rice grain are filled to the internal cylinder 2c shown in FIG. 5 (B) is provided to interior of the internal cylinder 2c. Further, after filling, when a net is covered on the soy beans, the soy beans can be stably maintained in the internal cylinder.

Successively, the internal cylinder 2c is inserted into the external cylinder 2 shown in FIG. 4. On the other hand, water is reserved at about 30–50 liters in the atomizer 1 shown in FIG. 2. Further, it is made such that aforementioned amount of water is always automatically maintained to the pulverizing minute particle generating tank 1.

At a time when a preparation of a water in the pulverizing minute particle generating tank 1 and the soy beans as a raw material in the extracting device 2 are finished, an establishment of the water temperature within the water tank 1 is done by the heater 1b of the pulverizing minute particle generating tank 1. In case of using the soy beans for a raw material, the established temperature is known as 85 degrees Celsius is a temperature which is most suitable for maintaining a temperature within the extracting device to 60–70 degrees Celsius as will be described hereinafter.

When the water temperature within the water tank 1 reaches 85 degrees Celsius which is an established temperature, a switch of the ultrasonic wave generating device 1a is turned on, and on the other hand, a switch of the blower is also turned on. In accordance with the operation of this blower 5, an air flow circulates the circulating path formed by the atomizer 1, the extracting device 2, the condensing device 3, the reserving tank 4, and the blower 5, and the connecting pipes connecting these respective devices.

For this reason, the atomized water generated at the atomizer 1 pass through the aforementioned plastic pipe P1 together with the air flow and reach the extracting device 2. Further, the temperature of the atomized water at the extracting device 2 is desirable at the range of 60–70 degrees Celsius as aforementioned. For this reason, the temperature within the extracting device is always detected by a temperature sensor fixed to the extracting device 2, and the water temperature within the atomizer 1 is controlled in response to the detected result of aforementioned sensor in order to obtain a desirable temperature.

As described above, the air flow is circulated between each device by the operation of the blower 5, but since the soy beans being a raw material are filled to the extracting device 2, the air flow passed through the pipe P1 receives a resistance at here and disturbed. On the other hand, anything disturbing the passing of air flow is not present at the circulating path below the connecting pipe P2. For this reason, a space within the extracting device 2 becomes to a decompressed stage.

When the space within the extracting device 2 becomes to a decompressed state, a known ingredient and unknown ingredient contained within the soy beans are extracted out to the surface of crushed pieces of soy beans being a raw material. The above described various ingredients extracted out to the surface of the soy beans pieces are captured by the passing atomized water particles. As described above, since the temperature within the extracting device, more particularly the temperature within the internal cylinder 2c is maintained to approximately 65 degrees Celsius, the ingredients contained by the soy beans are extracted into the atomized water without being destroyed by a heat.

The atomized water particles containing the effective ingredient of the soy beans reach the respective condensing cylinder 3a of the condensing device 3 through the connecting pipe P2 together with the air flow. Since the condensing cylinder 3a and the cooling plate 3b of interior are present within the cooling chamber 7 and cooled, the atomized water particles passing therein are liquefied and changed to a water containing the effective ingredient of the soy beans. This soy bean ingredient containing water is dropped to the reservoir tank 4, and finally collected to the second reservoir tank 6 through the drain pipe 6a.

The soy bean ingredient containing water collected to the second reservoir tank 6 is filtered by a filter for eliminating miscellaneous impurities, and then it is forwarded as a health beverage in which an effective ingredient of soy beans is major ingredient as a final product.

On the other hand, the atomized water particles which were not liquefied at the condensing device 3 are sucked to the blower 5 through the connecting pipe 4 together with the air flow and returned to the atomizer 1, and thereafter sent again to the extracting device 2 through the plastic pipe P1.

As described above, the atomized water circulates the circulating path so that the effective ingredient of the soy bean being a raw material is captured into the atomized water, and thereby the health beverage containing the effective ingredient of the soy bean is obtained by liquefying this atomized water, and the operating time of one time of the manufacturing apparatus is one hour. That is, in the above described embodiment, a health beverage containing the soy bean ingredient of finally about 3–5 liters could be manufactured by executing one hour extraction by using the soy bean crushed pieces of about 180 grams.

However, although a rice grain size is used for the crushed pieces of the soy beans in the above described embodiment, a density of the effective ingredient contained to be health beverage as a final product can be controlled by variously changing the magnitude of the crushed piece of the soy bean. That is, as the crushed piece of the soy bean is finely made, a product being high in density can be obtained. But, in that case, the manufacturing quantity per hour is decreased. On the contrary, when the soy bean crushed piece is made to be bigger, the yield per hour is increased, and the ingredient density becomes smaller.

In the above described embodiment, although the guide plate 2d is used for the internal cylinder 2c of the extracting device 2, when this guide plate is used, the yield of the health beverage per hour increases about 20% compared to a case of no use, but the density is decreased.

However, in the embodiment in relation to the above described health beverage manufacturing apparatus, as shown in FIGS. 1, 2 and 3, although the unliquefied atomized water is returned to the atomizer 1 through the connecting pipe P4 and the blower 5, since the temperature of this atomized water is cooled at the cooling chamber 7, it is dropped up to about 15 degrees Celsius. And, when this cooled atomized water is mixed with newly generated atomized water at the water tank 1 at this state and sent to the plastic pipe P1, the temperature of the newly atomized water particle is dropped and condensed thereby charging to a water droplet, and thereby a transfer of the atomized water in the pipe P1 may be disturbed. To avoid this problem, it is good to do either heating a part of the connecting pipe P4 of outside of the cooling chamber, or the atomized water sent to the atomizer 1 from the blower 5 is rotated by a rectifying plate of spiral shape, and then the temperature of the atomized water is raised during that time and sent again to the plastic pipe P1.

The health beverage obtained by the above described health beverage manufacturing apparatus and manufacturing method is a colorless, transparent and clear liquid. The ingredient of the soy bean contained within this liquid not only contains known material, but also contains unknown active material which has not been analyzed and extracted.

This health beverage refined from the soy been has a really noticeable efficacy, and numerous examples promoted with an activation of human cell are reported by drinking every after meals by adding 5 cc of this health beverage to 180 cc of water. And, since this health beverage has a vague smell and a faint flavor of soy bean, for instance, when it is drunk by adding to a mineral water and the like, not only its taste is made to be rich, but also it brings a glad tidings to the health promotion.

In the above described embodiment, although the soy bean is used as a raw material, without limiting to the soy bean, it is possible to manufacture entirely new health beverage by using various materials told as contributing to human health from ancient.

The present invention can obtain a health beverage which is particularly extremely effective and novel for human health maintaining by extracting ever an ingredient which could not be extracted heretofore from various materials by the construction and operation as described above.

What is claimed is:

1. A health beverage manufacturing apparatus for extracting an ingredient from a substance, comprising:

a water atomizer including a water reservoir, a heater for heating water in said water reservoir, and an associated ultrasonic wave generating device for assisting in atomizing the water in said water reservoir;

an extracting device having an inlet communicating with an outlet of said atomizer and including holding means for holding the substance with the ingredient to be extracted in a crushed state;

said inlet of said extracting device receiving atomized water from said atomizer so that a mixture of the atomized water and the ingredient to be extracted is formed within said extracting device;

a condenser having an inlet communicating with an outlet of said extracting device for receiving a mixture of atomized water and the extracted ingredient and liquefying at least a portion of the mixture;

a first reservoir having an inlet communicating with an outlet of said condenser for receiving at least a portion of the liquefied mixture, wherein said first reservoir is a substantially airtight pressure vessel; and a blower operatively associated with said apparatus for providing the atomized water entering said extracting device through said extracting device inlet at a higher pressure than the pressure of the mixture of atomized water and the extracted ingredient exiting said extracting device at said extracting device outlet, thereby producing a decompressed state in said extracting device and enhancing the extraction of the ingredient in the substance to be extracted.

2. The apparatus of claim 1, wherein said condenser and first reservoir are housed within a cooling chamber in order to maintain said condenser and first reservoir at a desired temperature.

3. The apparatus of claim 2, wherein said blower has an inlet communicating with an outlet of said first reservoir for receiving the atomized water and extracted ingredient mixture that was not liquefied in said condenser and received by said first reservoir; and wherein said blower has an outlet communicating with an inlet of said atomizer.

4. The apparatus of claim 2, wherein said blower comprises a rotating spiral rectifying plate for increasing the temperature of the atomized water and extracted ingredient mixture that was not liquefied in said condenser and received by said first reservoir, such that the transfer of said mixture with newly atomized water from said water reservoir will not be disturbed.

5. The apparatus of claim 2, further comprising a second reservoir connected to said first reservoir for receiving the liquefied mixture from said first reservoir, thereby maintaining a substantially constant pressure and volume in said first reservoir.

6. The apparatus of claim 2, further comprising means for maintaining said water reservoir at a substantially constant level, thereby maintaining a substantially constant volume and pressure in said atomizer.

7. The apparatus of claim 2, wherein said condenser comprises an internal cooling plate for enhancing the liquefying of the mixture of atomized water and the extracted ingredient received at said condenser inlet.

8. The apparatus of claim 2, wherein said condenser inlet comprises a top branch pipe and said condenser outlet comprises a bottom branch pipe; and wherein said condenser comprises a plurality of condenser cylinders extending from said top branch pipe to said bottom branch pipe, thereby enhancing the liquefying of the mixture of atomized water and the extracted ingredient received at said condenser inlet.

9. The apparatus of claim 1, wherein said blower has an inlet communicating with an outlet of said first reservoir for receiving the atomized water and extracted ingredient mixture that was not liquefied in said condenser and received by said first reservoir; and wherein said blower has an outlet communicating with an inlet of said atomizer.

10. The apparatus of claim 1, wherein said extracting device comprises a temperature sensor for sensing the temperature in the extracting device; and wherein said heater is controlled in response to a signal from said temperature sensor in order to maintain said water reservoir at a predetermined temperature.

11. The apparatus of claim 10, wherein said predetermined water temperature is approximately 85 degrees Celsius, thereby maintaining said extracting device at a temperature of approximately 60 to approximately 70 degrees Celsius.

12. The apparatus of claim 1, wherein the substance with the ingredient to be extracted is a soybean, and the soybean is crushed to pieces of approximately the size of rice grain with a weight of approximately 180 grams.

13. The apparatus of claim 1, wherein the substance with the ingredient to be extracted is one of soybeans, malt, and ginseng.

14. The apparatus of claim 1, wherein said holding means of said extracting device comprises:

an internal cylinder with a bottom screened portion located near said extracting device inlet; and a guide plate disposed within said internal cylinder;

said guide plate including a plurality of substantially uniform concentric walls extending radially from a central longitudinal axis of said internal cylinder;

wherein the substance with the ingredient to be extracted is distributed in a crushed state between said concentric walls of said guide plate; and wherein said guide plate increases the yield of the health beverage apparatus by increasing the extraction rate of the ingredient from said substance.

15. The apparatus of claim 14, wherein said extracting device further comprises:

a first external cylindrical half including said extracting device inlet for receiving said internal cylinder;

a second external cylindrical half including said extracting device outlet detachably connected to said first half;

wherein said first half and second half form a substantially airtight pressure vessel which allows a decompressed state to exist therein; and wherein said internal cylinder containing the substance can be easily installed and removed from said extracting device by detaching said first half from said second half.

16. The apparatus of claim 1, wherein said holding means of said extracting device comprises:

an internal cylinder with a bottom screened portion located near said extracting device inlet; and a guide plate disposed within said internal cylinder;

said guide plate including a substantially uniform wall extending radially in a spiral fashion from a central longitudinal axis of said internal cylinder;

wherein the substance with the ingredient to be extracted is distributed in a crushed state in regions formed within said guide plate by said spiraling wall; and wherein said guide plate increases the yield of the health beverage apparatus by increasing the extraction rate of the ingredient from said substance.

17. The apparatus of claim 16, wherein said extracting device further comprises:

a first external cylindrical half including said extracting device inlet for receiving said internal cylinder;

a second external cylindrical half including said extracting device outlet detachably connected to said first half;

wherein said first half and second half form a substantially airtight pressure vessel which allows a decompressed state to exist therein; and wherein said internal cylinder containing the substance can be easily installed and removed from said extracting device by detaching said first half from said second half.

18. The apparatus of claim 1, wherein said blower comprises a rotating spiral rectifying plate for increasing the temperature of the atomized water and extracted ingredient mixture that was not liquefied in said condenser and received by said first reservoir, such that the transfer of said mixture with newly atomized water from said water reservoir will not be disturbed.

19. The apparatus of claim 1, further comprising a second reservoir connected to said first reservoir for receiving the liquefied mixture from said first reservoir, thereby maintaining a substantially constant pressure and volume in said first reservoir.

20. The apparatus of claim 1, further comprising means for maintaining said water reservoir at a substantially constant level, thereby maintaining a substantially constant volume and pressure in said atomizer.

21. The apparatus of claim 1, wherein said condenser comprises an internal cooling plate for enhancing the liquefying of the mixture of atomized water and the extracted ingredient received at said condenser inlet.

22. The apparatus of claim 1, wherein said condenser inlet comprises a top branch pipe and said condenser outlet comprises a bottom branch pipe; and wherein said condenser comprises a plurality of condenser cylinders extending from said top branch pipe to said bottom branch pipe, thereby enhancing the liquefying of the mixture of atomized water and the extracted ingredient received at said condenser inlet.

* * * * *

Disclaimer and Dedication

5,558,006—Nobuyoshi Kuboyama, Carlisle, MASS. HEALTH BEVERAGE PLANT EXTRACTION APPARATUS, Patent dated Sept. 24, 1996, Disclaimer and dedication filed Oct. 8, 2002, by the inventor.

Hereby disclaims and dedicates to the public all claims of said patent.

*(Official Gazette, June 24, 2003)*